J. A. KIMBALL.
Button-Hole Bouquet-Holders.
No. 152,804.            Patented July 7, 1874.
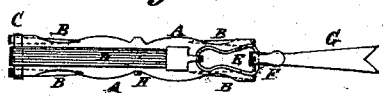
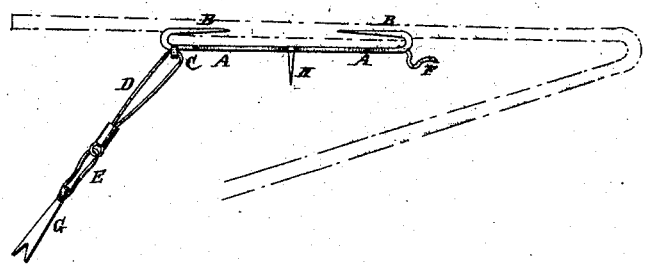
WITNESSES:
INVENTOR:
J. A. Kimball
BY
ATTORNEYS.

UNITED STATES PATENT OFFICE

J. ALBERT KIMBALL, OF NEW YORK, N. Y.

IMPROVEMENT IN BUTTON-HOLE-BOUQUET HOLDERS.

Specification forming part of Letters Patent No. 152,804, dated July 7, 1874; application filed May 9, 1874.

*To all whom it may concern:*

Be it known that I, J. ALBERT KIMBALL, of New York city, in the county and State of New York, have invented a new and useful Improvement in Button-Hole-Bouquet Holder, of which the following is a specification:

Figure 1 is a view of the outer side of my improved device, shown closed. Fig. 2 is an edge view of the same, shown open.

Similar letters of reference indicate corresponding parts.

My invention has for its object to furnish an improved device to be attached to the lapel of a coat, for holding a button-hole bouquet securely in a button-hole, and which shall be simple in construction, and convenient in use.

The invention consists in an improved button-hole-bouquet holder, formed of a bar or plate provided with hook-prongs, or an equivalent pin, a bar or loop, a hook, and one or more teeth, and an elastic strap provided with a loop, and a tag or tassel, as hereinafter fully described.

A is a small bar or narrow plate, the ends of which are bent inward, and have sharp-pointed prongs or hooks B formed upon or attached to them, as shown in Figs. 1 and 2. If desired, the hooks B may be replaced by a pin, hinged at one end of the bar A, and the point of which is sprung into a hook or catch attached to the other end of said bar A. To the outer side of one end of the bar or plate A is attached a bar, loop, or hook, C, to receive one end of an elastic strap, D, to the other end of which strap is attached a loop, E, to be hooked over a hook, F, formed upon or attached to the other end of the bar or plate A. The loop E has a short strap, tag, or tassel, G, attached to its end, for convenience in hooking and unhooking it, and is made long, and is contracted in the middle, as shown in Figs. 1 and 2. When not holding a bouquet the free end of the loop E is hooked upon the hook F, so that the elastic strap D may not be strained. When holding a bouquet the loop E is drawn outward until hook F is in its inner end, and it is then turned downward, so as to put the elastic strap D under a strain, and thus hold the bouquet securely. Upon the outer side of the bar or plate A are formed one or more teeth or prongs, H, to hold the stems of the flowers, and prevent them from being drawn out of the holder.

The holder is designed to be attached to the under side of the lapel of the coat, just below the button-hole, through which the stems of the flowers are to be passed. The elastic strap D is then passed around their stems, and the loop E is hooked upon the hook F, as hereinbefore described.

Having thus described my invention, what I claim as new, and desire to secure by Letters Patent, is—

An improved button-hole-bouquet holder, formed of the bar or plate A, provided with prongs B, or an equivalent pin, a hook, F, a bar or loop, C, and one or more teeth, H, and the elastic strap D, provided with a loop, E, and tag or tassel G, substantially as herein shown and described.

J. ALBERT KIMBALL.

Witnesses:
JAMES T. GRAHAM,
T. B. MOSHER.